This invention relates to synthetic lubricating compositions and to a process for their preparation. The invention more particularly relates to complex ester type synthetic lubricants such as those formed from glycols, dicarboxylic acids and alcohols and to a process for their preparation.

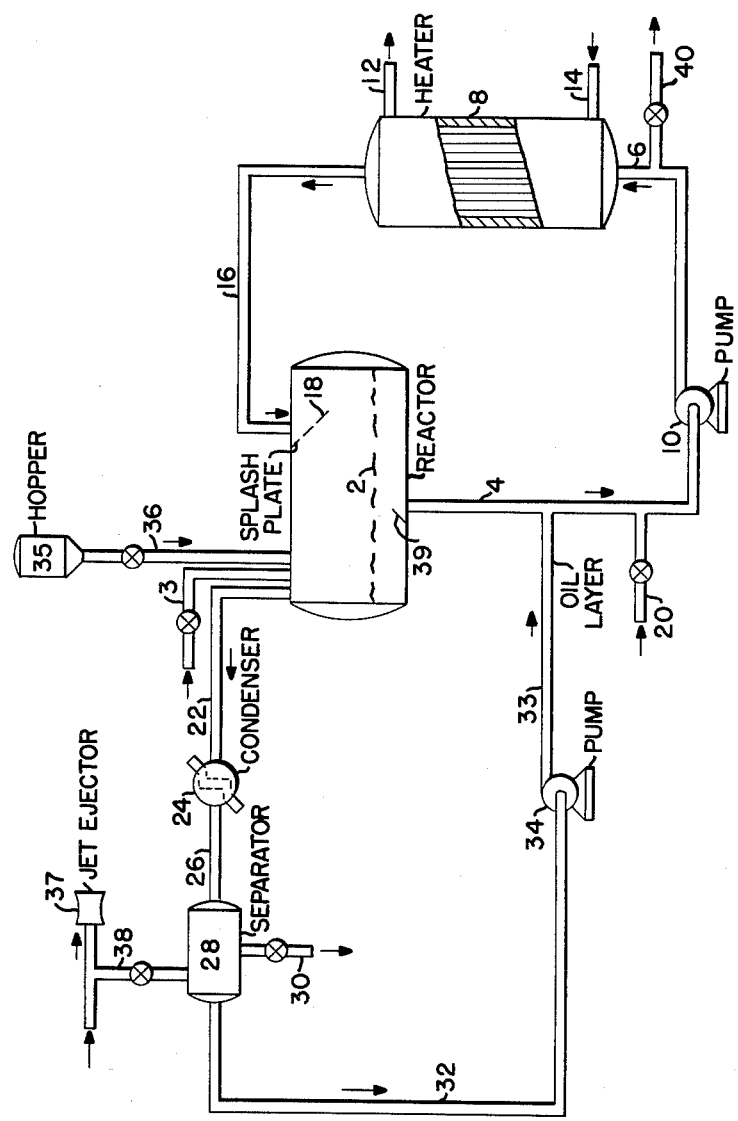
Alfred H. Matuszak
Daniel S. Maisel
E. Wendell Carrier
Inventors 3,048,623
PREPARATION OF COMPLEX DIESTER
SYNTHETIC LUBRICANTS
Alfred H. Matuszak, Westfield, Daniel S. Maisel, Union, and E. Wendell Carrier, Cranford, N.J., assignors to Esso Research and Engineering Company, a corporation of Delaware
Filed Nov. 1, 1957, Ser. No. 693,913
3 Claims. (Cl. 260—485)

This application is a continuation-in-part of U.S. Patent No. 2,820,815, filed April 8, 1954.

Complex ester type synthetic lubricating oils prepared by combinations of glycols, dicarboxylic acids, monocarboxylic acids and alcohols are well known in the art of synthetic lubricant manufacture. These esters are of the following general types:

I. Glycol centered complex esters, i.e. alcohol-dicarboxylic acid-(glycol-dicarboxylic acid)$_x$-alcohol.
II. Dicarboxylic acid centered complex esters, i.e. monocarboxylic acid-glycol-(dicarboxylic acid-glycol)$_x$-monocarboxylic acid.
III. Alcohol-acid terminated complex esters, i.e. monocarboxylic acid-(glycol-dicarboxylic acid)$_x$-alcohol.

wherein $x$ is a number greater than zero.

Complex esters are described in detail in U.S. Patents 2,575,195, 2,575,196 and 2,703,811.

The known methods of preparation of these complex ester synthetic lubricants are the one-step and the two-step processes. The two-step process for type I esters is carried out by adding a dicarboxylic acid, a glycol, a catalyst, and a water entrainer in desired amounts. The mixture is then refluxed until the half ester is formed and the desired acid number is obtained. Thereafter an alcohol is added rapidly and the mixture heated to complete the formation of the complex ester. The reaction product is then stripped of excess water entrainer and low boiling reactants.

Alternatively, the two-step reaction can be carried out by reacting the required amounts of an alcohol with a dicarboxylic acid to give the half ester. The half ester is then reacted with the required amount of glycol to give the crude complex ester, which is thereafter purified.

In the known one-step process all of the ingredients are mixed together and esterified together and the resulting crude complex ester is then purified.

There are several disadvantages inherent in the prior art process. The presence of trace amounts of oxygen during processing contributes to high acid numbers and corrosivity of the product. Accordingly, air must be excluded from the reaction vessel. Air leakage into the reaction and purification zones is, however, very difficult to control since mixing is usually carried out by means of a stirrer which must pass through a stuffing box which is difficult to keep air-tight. Another disadvantage typical of batch reactions is that the addition of the total amounts of an ingredient at one time results in formation of undesirable by-products. Foaming is also a problem in these processes because it results in decreased reactor capacity and prevents the attaining of desired reaction rates. Temperature control is difficult to maintain and the rates of heat transfer are relatively low when the mass is heated by wall contact. Also, different vessels are needed for different steps of the processes.

Another disadvantage where low pressure purification is carried out is that a liquid head forms which causes either a decrease in the amount of reactants which can be removed or an increase in the temperature to which the crude product must be heated to obtain a product having a specified viscosity.

It has now been found that all the above disadvantages can be overcome by a process involving the use of a circulating system wherein the products and the reactants are continuously circulated through a reaction zone and a heating zone.

FIGURE I represents a flow plan of the process of this invention.

The alcohols used in preparing the complex esters of the invention are straight and branched-chain aliphatic alcohols having from 4 to 20 carbon atoms per molecule. Particularly preferred are branched-chain alcohols such as those derived from the carbonylation of olefins and which contain from about 4 to 10 carbon atoms per molecule. Alcohols containing ether and thioether linkages can also be used, such as beta-n-dodecylmercaptoethanol and ethylene glycol mono-2-ethylbutyl ether.

The dicarboxylic acids useful in the present invention are straight or branched chain aliphatic dicarboxylic acids having from 2 to 12 carbon atoms per molecule. Acids containing an ether linkage or a thioether linkage can also be employed. Examples of dicarboxylic acids useful herein are malonic acid, adipic acid, azelaic acid, isosebacic acid, sebacic acid, diglycolic acid and thiodiglycolic acid.

The monocarboxylic acids which are used in the present invention are straight or branched-chain aliphatic monocarboxylic acids having from 2 to 20 carbon atoms per molecule, such as acetic acid, caprylic acid, and stearic acid. Acids containing an ether linkage or a thioether linkage can also be employed, e.g. betaethoxypropionic acid and betaethylmercaptopropionic acid.

The glycols employed in preparing the esters of the present invention are straight or branched chain glycols having from 2 to 60 carbon atoms per molecule e.g. ethylene glycol and any of its paraffinic homologues containing up to 18 carbon atoms, propylene glycol, butylene glycols, pinacol, trimethylene glycol, tetramethylene glycol, pentamethylene glycol, and the like. Compounds such as diethylene glycol, triethylene glycol, the polyoxyethylene glycols of the formula:

$$HOCH_2CH_2O(CH_2CH_2O)_nH$$

wherein $n$ is 1 to 26, and the polyoxypropylene glycols of the general formula

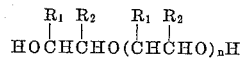

$$HOCHCHO(CHCHO)_nH$$
$$\phantom{HO}R_1\phantom{HO}R_2\phantom{O(}R_1\phantom{HO}R_2$$

where either $R_1$ or $R_2$ is a methyl group and the other is hydrogen, and where $n$ is 1 to 20, can likewise be employed. Glycols containing isolated ether linkages such as 2-alkoxymethyl-2,4-dimethyl-pentanediol-1,5 can be used. Glycols containing sulfur atoms in thioether linkages can also be employed, and these include such compounds as thiodiglycol and 1,2-bis(2-hydroxyethylmercapto)ethane. Glycols containing both oxygen and sulfur in similar linkages, such as bis-2-(2-hydroxyethoxy) ethyl sulfide can also be used. Although glycols containing primary functional groups are preferred herein because of their generally greater thermal stability, secondary and tertiary glycols can also be employed.

The complex ester synethtic lubricants of the invention have a viscosity within the range of about 60 to 2500 S.S.U. at 100° F. and about 35 to 200 S.S.U. at 210° F., a pour of about +20 to −75° F., and a flash point of about 350° to 650° F.

With reference now to FIGURE I, which represents a flow plan of the process, the desired amount of a glycol is charged to reactor drum 2 through valved line 3. About 15 to 40 wt. percent, based on the weight of the glycol, of a water entrainer, which is preferably a hydrocarbon such as heptane, hexane, toluene, xylene, and the like is charged with the glycol to reactor 2. A catalytic amount, from 0.1 to 0.5 wt. percent, based on the estimated weight of the ester product, of an esterification catalyst such as sodium acid sulphate, toluene sulfonic acid, sulfuric acid, and the like, is added to the mixture of entrainer and glycol to increase the rate of reaction. The mixture is then circulated through lines 4 and 6 into a heating zone 8 by means of a circulating pump 10. The heating zone can be of the jacketed reboiler type heater wherein the heat exchange occurs through the walls of a plurality of tubes surrounded by the heating medium. Hot oil, Dowtherm, or other liquid heating medium can be circulated through the heating zone by means of lines 12 and 14. Other similar types of heating zones can also be employed. After passing through the heating zone, the mixture is passed through line 16 and returned to reactor 2 with impingement on splash plate 18 upon reentry into the reaction zone. The use of this circulating system eliminates the need for external agitation means such as a propeller type agitator and its stuffing box. The rate of circulation can be controlled so that residence time in the heating zone is as short or as long as is desired. The rate of circulation through the heating zone and the temperature maintained in the heating zone are adjusted for any particular system to provide the requisite amount of heat to keep the system at reaction temperature and maintain refluxing of the water entrainer, and to provide proper mixing of reactants. The rate of circulation and the temperature maintained in the heating zone are not critical, and desirable values can easily be determined for any system by simple, routine experimentation. When the temperature of the circulating mixture reaches the boiling point of the water entrainer-glycol mixture, refluxing commences. Entrainer vapors are taken overhead from the reactor 2 through line 22, through condenser 24, and then through line 26 into separator vessel 28. Since at this time there is no water present in the entrainer vapors, the condensed entrainer is returned through lines 32 and 33 to line 4 by means of circulating pump 34. In line 4, the condensed entrainer is mixed with the circulating mixture and passed into heating zone 8 and from there into reactor 2. Next, the desired amount of a dicarboxylic acid is added to the circulating mixture at a controlled rate. In general, two moles of dicarboxylic acid per mole of glycol is added to the circulating mixture at a rate in the range of from 0.2 to 1.0 mole per hour. If the acid used is a liquid it can be added through valved lines 3 or 20. If the acid is a solid it is added from a storage hopper 35 through valved line 36. Storage hopper 35 can be equipped with a star-feeder or other means for proportioning solids for ease of addition of the desired amount of acid. When all or part of the dicarboxylic acid is added to the circulating mixture and becomes dissolved or melted therein, reaction between the acid and the glycol commences, liberating water. The water is vaporized, entrained by the entrainer vapor, and the mixture of vapors is taken overhead by means of line 22, condensed to liquid in condenser 24, passed through line 26 and into separator 28. Here the water separates from the entrainer in a lower layer and is withdrawn from the separator vessel through valved line 30. The water entrainer in the upper layer is recirculated to the circulating mixture of reactants as described above. The temperature of the total circulating mixture is adjusted by means of heater 8 to a final temperature between about 360° and 400° F. The reaction is usually completed in from 2 to 10 hours. It is allowed to continue, however, for a time necessary to obtain a desired acid number.

When the reaction between the dicarboxylic acid and the polyhydric material is substantially complete, alcohol in controlled amounts, i.e. from 2 to 3 mols, preferably 1.2 mols of alcohol per mol of glycol and at a rate in the range of 0.25 to 1.2 mols per hour is added through line 20 to esterify the reaction product of the dicarboxylic acid and the glycol. On addition of all or a part of the alcohol to the circulating stream foaming may occur in the system. In this system, unlike the systems of the prior art where the reaction vessel is heated directly, foaming actually increases the rate of reaction by virtue of an increase in the rate of circulation and in the rate of heat exchange, and is beneficial rather than detrimental to the reaction. The foam can be broken down in the upper section of the reboiler by control of heat input and by means of splash plate 18. The circulation of this mixture is continued until the reaction is substantially complete, as evidenced by the neutralization number of the mixture. Ordinarily the reaction will be complete in from about 2 to about 10 hours at a final temperature of about 400° to 430° F. Once the reaction is substantially complete, the water entrainer and some lower boiling constituents are rejected from the reaction zone by vaporization below 430° F. and are removed through line 30. If desired, the product can be vacuum stripped by techniques known to the art. The product is removed through valved line 38 and is washed and treated by techniques known to the art.

There can also be included in the circulating system a filter 39 for preventing the circulation of solid catalyst with the circulating mixture. This filter is preferably located in reactor 2 at the entrance to line 4 and is adapted to be opened or closed. It can be opened to permit passage of added acid if the acid used is a solid, and then closed to prevent solid catalyst circulation once the acid is melted or dissolved. It may also be desirable to equip line 4 with a by-pass system containing a second filter, which, once the reaction is finished and the complex ester product prepared, can then be used to filter out the solid catalyst.

The above embodiment of the invention relates to the preparation of complex esters of type I having the formula: Alcohol-dicarboxylic acid-(glycol-dicarboxylic acid)$_x$-alcohol, and the invention is not restricted to this embodiment which is given by way of example only.

When it is desired to prepare complex esters of type II, that is, complex esters having the formula: Monocarboxylic acid-glycol-(dicarboxylic acid-glycol)$_x$-monocarboxylic acid, the procedure is as follows: Either the glycol or the dicarboxylic acid is first charged to the reactor along with the entrainer and the catalyst. Ordinarily, the glycol is added first. After reaction temperature is reached, there is added to the circulating stream the calculated amount of a dicarboxylic acid or glycol, depending upon the material first added. After the esterification is complete, the desired amount of the monocarboxylic acid is added, and the reaction is then carried to completion and the product isolated as described above for type I esters.

In preparing a complex ester of type III, that is, one having the formula: Monocarboxylic acid -(glycol-dicarboxylic acid)$_x$-alcohol, the process is carried out as follows: Either the glycol or the dicarboxylic acid, preferably the former, is charged to the reactor with the catalyst and the water entrainer. After reaction temperature is reached, an equimolar proportion of the dicarboxylic acid or the glycol, depending upon which reactant was previously charged to the reactor, is added and esterification carried out. After the esterification is complete, an equinormal quantity of a monocarboxylic acid is charged and reacted with the unesterified group of the glycol. Then the alcohol, in about equinormal quantity, is added to esterify the unesterified carboxyl group of the dicarboxylic acid.

Various modifications of these procedures can be made without departing from the spirit of the inventive concept such as by modifying the above procedures for the one-step process.

An example illustrating the preferred embodiment of the invention is as follows:

*Example 1*

182 pounds of commercial tetraethylene glycol, 9 gallons of toluene as a water entrainer, and 2 pounds of anhydrous sodium hydrogen sulfate was introduced into the reactor 2 of 140 gallons capacity through valved line 36 from hopper 35. The circulation pump 10 was started, a circulation rate of 5 to 10 gallons per minute was maintained and the temperature of the circulating mixture raised to reflux by means of heat exchanger 8. When refluxing occurred and the refluxing system was in operation, 400 pounds of sebacic acid was introduced at a rate of about 80 pounds per hour through line 36 from hopper 35. Circulation was continued and the temperature was raised gradually to a final temperature of 365° F. by means of heater 8. When a sample of the circulating stream showed a neutralization value of about 200 milligrams of KOH per gram of product, which occurred about 6 hours after addition of the sebacic acid was started, 320 pounds of 2-ethyl hexanol was added at a rate of about 50 pounds per hour through valved line 20. The temperature of the circulating mixture was then increased gradually to about 425° F. Circulation was continued until a neutralization number of 4 milligrams of KOH per gram of product was reached which required about 7 hours. Circulation of the mixture through the heater was continuous throughout the total reaction time. When a neutralization number of 4 milligrams of KOH per gram of product was reached, the material taken overhead through line 22 was rejected through line 30. When all the material boiling below 425° F. was rejected at atmospheric pressure, reduction of pressure in the system was begun by means of steam jet ejectors 37 through valved line 38. The pressure in the system was gradually lowered over a period of 1.25 hours to a pressure of 20 mm. of mercury. The temperature was then gradually increased over a period of 7 hours to a temperature of 450° F. and the material boiling below 450° F. at a pressure of 20 mm. of mercury was taken overhead, condensed, and later rejected through line 30 at atmospheric pressure. 94 gallons of a product having a viscosity of 10.6 centistokes at 210° F. and a neutralization number of 1.5 was obtained. This product was withdrawn from the reaction zone through line 38, cooled, washed, and purified by methods known to the art.

Numerous important advantages are obtained by the inventive process. These include (1) minimum time during which reactants must be held at high temperatures; (2) elimination of foaming problems and, hence, decreased stripping and reaction periods; (3) increased rate of heat transfer which allows a more accurate control of temperature and minimizes starting up time; (4) controlled variation in the proportions of reactants present in the reaction zone at one time to give improved quality of product over that attainable in the conventional system; and (5) substantial elimination of leakage of oxygen into the reaction system.

The complex ester synthetic lubricants prepared as described hereinbefore may be admixed with mineral oils, either as concentrates or as finished blends. They can also be blended with other synthetic lubricants such as dibasic acid esters, complex esters, polymerized hydrocarbons, glycol ethers, glycol ether esters, formals and the like. They are also compatible with any of the well known additive materials, and finished lubricating blends can comprise a major proportion of these complex esters either alone or blended with other lubricants, and minor proportions of such agents as viscosity index improvers, pour point depressants, detergent inhibitors, antioxidants, rust inhibitors, extreme pressure agents, and the like.

What is claimed is:

1. In a process for preparing complex esters from one molar proportion of glycol of from 2–60 carbon atoms per molecule, two molar proportions of an aliphatic dicarboxylic acid of 2–12 carbon atoms per molecule and 2 to 3 molar proportions of an aliphatic alcohol of from 4–20 carbon atoms per molecule, the improvement which comprises first forming a circulating system comprising a reaction zone and a heating zone, adding to the circulating system glycol, a water entrainer and an esterification catalyst, then heating the circulating mixture to reflux temperature, then adding the dicarboxylic acid at a controlled rate of from 0.2 to 1.0 molar proportion of acid/hour to the system, removing water from the system until substantially all the acid has reacted with the glycol, then adding said alcohol at a controlled rate of 0.25 to 1.2 molar proportions of alcohol/hour, removing water from the system and recovering said complex ester.

2. The process for forming a complex ester comprising one molar proportion of glycol having from 2 to 60 carbon atoms per molecule, two molar proportions of an aliphatic dicarboxylic acid having from 2 to 12 carbon atoms per molecule and 2 to 3 molar proportions of an aliphatic alcohol of from 4–20 carbon atoms per molecule comprising the steps of forming a circulating system comprising a reaction zone and a heating zone adding said glycol, 15 to 40 wt. percent of a water entrainer and 0.1 to 0.5 wt. percent of an esterification catalyst to the circulating system, then heating the system to reflux, then adding said dicarboxylic acid at a rate of from 0.2 to 1.0 molar proportion per hour, removing water from the system until the reaction is substantially complete, then adding said alcohol to the circulating system at a rate in the range of 0.25 to 1.2 molar proportions per hour, removing water from the system until this reaction is subtantially complete and recovering said complex ester.

3. The process for forming a complex lubricating ester comprising the steps of forming a circulating system comprising a reaction zone and a heating zone, adding tetraethylene glycol, 15 to 40 wt. percent toluene, and 0.1 to 0.5 wt. percent sodium hydrogen sulfate to the circulating system, then heating the system to reflux, adding 2 moles of sebacic acid per mole of glycol to the circulating system at a rate of from 0.2 to 1.0 mole per hour/mole of glycol, removing water entrainer containing entrained water from the system, adding water entrainer free from entrained water to the system, adding from 2 to 3 moles of 2-ethyl hexanol per mole of glycol to the circulating system at a rate of from 0.25 to 1.2 moles per hour/mole of glycol, while continuing the heating of, and the removal of water entrainer from, the circulating system to form said complex ester, and purifying said ester.

References Cited in the file of this patent

UNITED STATES PATENTS

| | | |
|---|---|---|
| 2,232,674 | Pyzel | Feb. 18, 1941 |
| 2,392,621 | Strain | Jan. 8, 1946 |
| 2,499,983 | Beavers | Mar. 7, 1950 |
| 2,575,195 | Smith | Nov. 13, 1951 |
| 2,575,196 | Smith | Nov. 13, 1951 |
| 2,666,781 | Ford | Jan. 19, 1954 |
| 2,695,279 | Kahn et al. | Nov. 23, 1954 |
| 2,703,811 | Smith | Mar. 8, 1955 |
| 2,820,815 | Matuszak et al. | Jan. 21, 1958 |